No. 839,465. PATENTED DEC. 25, 1906.
E. L. FREESE.
SAW.
APPLICATION FILED MAR. 29, 1906.
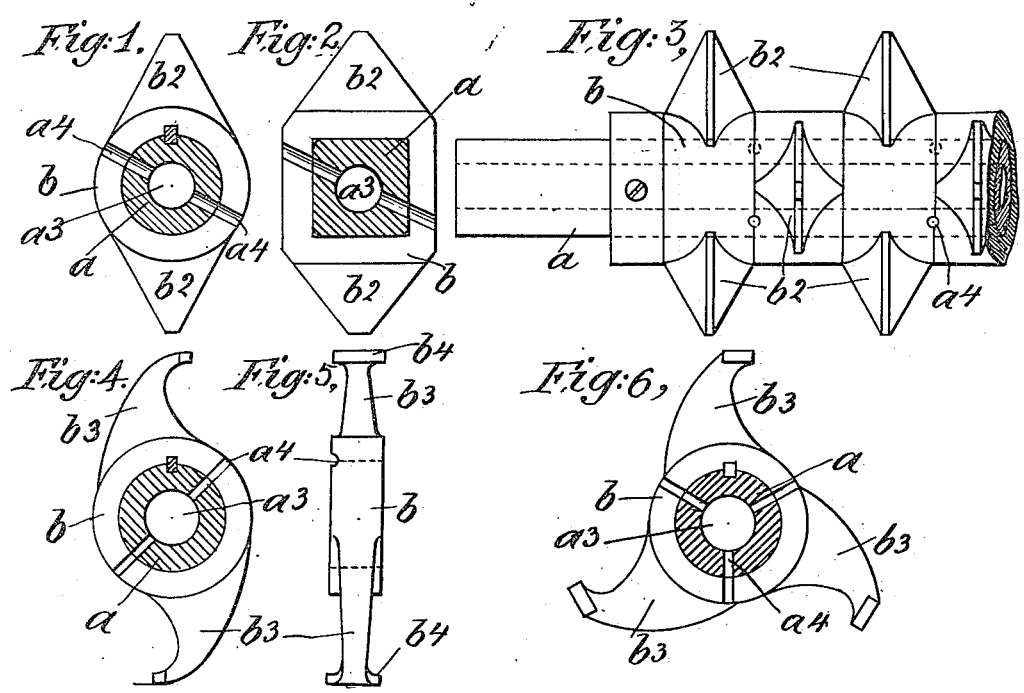
WITNESSES
INVENTOR
Etson L. Freese,
BY Edgar Tate & Co.
ATTORNEYS

UNITED STATES PATENT OFFICE.

ETSON L. FREESE, OF NEW YORK, N. Y.

SAW.

No. 839,465.      Specification of Letters Patent.      Patented Dec. 25, 1906.

Application filed March 29, 1906. Serial No. 308,659.

*To all whom it may concern:*

Be it known that I, ETSON L. FREESE, a citizen of the United States, residing at New York, in the county of New York and State of New York, have invented certain new and useful Improvements in Saws, of which the following is a specification, such as will enable those skilled in the art to which it appertains to make and use the same.

This invention relates to saws; and the object thereof is to provide an improved device of this class which is particularly designed for use in felling large trees, as shown and described in an application for Letters Patent of the United States filed by me February 2, 1906, Serial No. 299,095, and which may also be used for cutting logs from trees of this class when felled and for various other and similar purposes; and with this and other objects in view the invention consists in a saw constructed as hereinafter described and claimed.

The invention is fully disclosed in the following specification, of which the accompanying drawings form a part, in which the separate parts of my improvement are designated by suitable reference characters in each of the views, and in which—

Figure 1 is a transverse sectional view of a saw made according to my invention; Fig. 2, a view similar to Fig. 1, but showing a modification; Fig. 3, a side view of a part of a saw made as shown in Fig. 1; Fig. 4, a view similar to Fig. 1, but showing another modification; Fig. 5, a side view of that part of the saw shown in Fig. 4; and Fig. 6 another view similar to Fig. 1, but showing another modification.

The saw which constitutes the subject-matter of this application is designed in use to be given both a longitudinal and a rotary movement and is also designed principally for use in the felling of large trees, and the body portion $a$ of the saw is preferably tubular in form, said body portion being provided with a longitudinal bore or passage $a^3$, and said body portion of the saw is also provided with radially-arranged ports or passages $a^4$, which communicate with the longitudinal bore $a^3$, and the object of the central longitudinal bore $a^3$ and the radially-arranged ports or passages $a^4$ is to provide means whereby water may be forced into and through the saw when the latter is in operation, so as to keep the saw cool and to facilitate the cleaning thereof and also to clean the cut formed by the saw in the tree which is being felled or the cut formed by the saw when dividing the body of the tree into logs, which may also be done.

The teeth of the saw are formed on collars $b$, adapted to be secured to the body portion of the saw and to be detached therefrom when desired, and it will be understood that the number of the collars $b$ depend on the length of the saw and the transverse width of said collars, together with the shape of the teeth, and in practice the collars $b$ are secured to the body portion $a$ of the saw, as indicated in Fig. 5, or so that the teeth on one collar will be at right angles to those on the adjacent collar or collars.

In the construction shown in Fig. 2 the body portion $a$ of the saw is angular in cross-section, and the collar $b$ is similarly formed, and it will be understood that the only difference between the construction shown in Fig. 1 and that shown in Fig. 2 is in the fact that the body portion $a$ of the saw is angular in cross-section.

The teeth $b^2$ (shown in Figs. 1 to 5, inclusive) project radially from the collars $b$ and may be of any desired shape or form; but in Figs. 4 and 5 I have shown a construction in which the body portion $a$ of the saw is tubular in form and the collars $b$ are provided with curved teeth $b^3$, having transversely-arranged cutting edges $b^4$, which project in opposite directions, as clearly shown in Fig. 4, and the construction shown in Fig. 6 is similar to that shown in Figs. 4 and 5, with the exception that the collar $b$ is provided with three teeth $b^3$. My invention is not limited, however, to any particular form for the teeth with which the collars $b$ are provided, and said teeth may be shaped or formed in any preferred manner or as experience may decide to be best.

The object of forming the teeth separately from the body portion of the saw is to provide means whereby the said teeth may be taken off and sharpened or repaired, and said teeth may in this way be made of material different from that of the body portion of the saw, if desired.

It will be understood that it is not absolutely necessary to make the body portion of the saw tubular in form; but when said body portion of the saw is made of tubular form the radial ports or passages $a^4$ register with corresponding radial ports or passages in the collars $b$, as shown in Figs. 1, 2, 4, and 6.

It will be understood that the ends of the saw may be made in any desired manner, and, as hereinbefore stated, my improved saw is designed for special use, as shown and described in the application for Letters Patent of the United States, hereinbefore referred to, in which suitable means are described for operating my improved saw, and in addition to the use herein specified it will be apparent that my improved saw may be used for various other purposes.

Having fully described my invention, what I claim as new, and desire to secure by Letters Patent, is—

1. A saw comprising a tubular body portion and collars detachably connected therewith and provided with radially-arranged teeth, said teeth being arranged in longitudinal and transverse rows, substantially as shown and described.

2. A saw comprising a tubular body portion and collars detachably connected therewith and provided with radially-arranged teeth, said teeth being arranged in longitudinal and transverse rows, and the body portion of the saw being provided with radial ports or passages, substantially as shown and described.

In testimony that I claim the foregoing as my invention I have signed my name, in presence of the subscribing witnesses, this 28th day of March, 1906.

ETSON L. FREESE.

Witnesses:
F. A. STEWART,
C. E. MULREANY.